United States Patent
Goss et al.

[11] Patent Number: 5,933,094
[45] Date of Patent: Aug. 3, 1999

[54] DEVICE FOR EDITING AND OUTPUTTING INFORMATION FOR A MOTOR VEHICLE DRIVER

[75] Inventors: Stefan Goss, Hildesheim; Dietmar Kell, Diekholzen, both of Germany

[73] Assignee: Robert Bosch GmbH, Stuttgart, Germany

[21] Appl. No.: 08/765,501

[22] PCT Filed: Apr. 20, 1996

[86] PCT No.: PCT/DE96/00691

§ 371 Date: Mar. 27, 1997

§ 102(e) Date: Mar. 27, 1997

[87] PCT Pub. No.: WO96/35198

PCT Pub. Date: Nov. 7, 1996

[30] Foreign Application Priority Data

May 5, 1995 [DE] Germany .......................... 195 16 477

[51] Int. Cl.$^6$ .................................................. G08G 1/09
[52] U.S. Cl. ......................... 340/905; 340/995; 701/208
[58] Field of Search ..................... 340/988, 990, 340/995, 905; 364/449.3, 449.4; 701/208, 209, 210, 211

[56] References Cited

U.S. PATENT DOCUMENTS

| 4,862,513 | 8/1989 | Bragas ....................................... 340/905 |
| 5,020,143 | 5/1991 | Duckeck et al. ........................... 340/905 |
| 5,172,321 | 12/1992 | Ghaem et al. ............................. 340/995 |
| 5,293,163 | 3/1994 | Kakihara et al. .......................... 340/995 |
| 5,315,295 | 5/1994 | Fujii .......................................... 340/905 |
| 5,406,490 | 4/1995 | Braegas ..................................... 340/995 |

OTHER PUBLICATIONS

Tech. 3244–E, Mar. 1984 of the European Broadcasting Union (EBU).
Alert C, Nov. 1990, published by RDS ATT ALERT Consortium.

*Primary Examiner*—Brent A. Swarthout
*Attorney, Agent, or Firm*—Kenyon & Kenyon

[57] ABSTRACT

A device for editing and outputting information for a motor vehicle driver, comprising a receiver for digitally coded traffic messages and an auto navigator, which is designed to determine the instantaneous position of the vehicle and to calculate route recommendations, linked by a data transmission device.

3 Claims, 5 Drawing Sheets

DEVICE FOR EDITING AND OUTPUTTING INFORMATION FOR A MOTOR VEHICLE DRIVER

FIELD OF THE INVENTION

The present invention relates to a device for editing and outputting information for a motor vehicle driver.

BACKGROUND OF THE INVENTION

The Radio Data System (RDS) enables digital data to be additionally and inaudibly transmitted in parallel with radio programs, in a data channel. Specifications of the Radio Data System for VHF sound radio are defined, inter alia, in the publication Tech. 3244 -E, March 1984 of the European Broadcasting Union (EBU). Besides receiving radio signals, radio receivers having the requisite RDS decoders can receive and decode transmitted data, using the same receiving part. The data transmission takes place in 32 groups of 108 bits each, a specific service being assigned to each group. The group 8a is provided for transmitting digitally coded traffic messages.

The structure and coding of these traffic messages are defined in detail in the proposed standard, ALERT C, November 1990, published by RDS ATT ALERT Consortium. The essential elements of a traffic message are the location of the occurrence and the event. This information is cataloged, i.e., a unique code is assigned to each location and event that have relevance to traffic. The locations are integrated in the location table along existing streets to reproduce the pattern. In addition to the customary receiver devices having an RDS decoder, in order to utilize the traffic report channel TMC (Traffic Message Channel), devices are needed for decoding, storing, further processing, and outputting the traffic messages.

Auto navigators have also become known, which determine the instantaneous position of a vehicle and, with the aid of a digitally stored road map and an entered travel destination, calculate and display proposed routes. To determine position, sensors, which detect the motion of the vehicle on the road surface, as well as satellite positioning systems (GPS) can be used. The calculated routes proposals can be output as maps with the proposed routes marked, or as an instruction on how to proceed at intersections and turn-offs. Thus, auto navigators are known, for example, where an arrow symbol that assumes different shapes and directions shows the motor vehicle driver the way. However, in known auto navigators, the route recommendations and, in some instances, other information are determined merely on the basis of a digitally stored road map, without giving consideration to vicissitudes in the road network, such as temporary irregularities resulting from traffic jams or stoppages.

SUMMARY OF THE INVENTION

The object of the present invention is to improve the information given to the motor vehicle driver over known devices and systems in the event of obstructed traffic.

This objective is achieved in accordance with the present invention in that a receiver for digitally coded traffic messages and an auto navigator, which is designed to determine the instantaneous position of the vehicle and to calculate route recommendations, are linked by a data transmission device.

The device according to the invention has the present advantage that digitally coded traffic messages are taken into consideration when proposed routes are calculated and displayed. Moreover, the device according to the present invention plays a role in not giving the vehicle driver an unnecessary excess of visual or acoustic traffic messages that are not relevant to his or her probable route.

The device according to the present invention can be so conceived that a wholly autonomous receiver for digitally coded traffic messages and a wholly autonomous auto navigator are linked, for example, via a data bus. However, it is also possible that the receiver or parts of the receiver used for managing, decoding and outputting traffic messages, together with essential components of the auto navigator, are realized by different programs in a processor, the data being transmitted along the lines of the present invention by accessing a shared memory.

To enable the auto navigator to respond as quickly as possible to traffic messages, one preferred specific embodiment of the present invention provides for new traffic messages received by the receiver to be transmitted spontaneously to the auto navigator.

In certain operating states, however, when the entered destination is changed or when the auto navigator is switched on, it can be advantageous, however, for the traffic messages to be transmitted in response to a request by the auto navigator.

An important procedure in a receiver for digitally coded traffic messages—also referred to in the following as TMC system—is selecting received traffic messages in accordance with predefined criteria. On the one hand, this is important for the vehicle driver in that he is not distracted by a multiplicity of traffic messages, which are of no importance to him, from those traffic messages which relate to his probable route. On the other hand, it is necessary to select the traffic messages to be transmitted to the auto navigator to avoid overloading the computer in the auto navigator. Therefore, a further embodiment of the device according present invention provides for the auto navigator to calculate criteria for selecting traffic messages to be transmitted to the auto navigator from the instantaneous position and from an entered destination and to transmit them to the receiver.

While a decidedly well-directed selection can be made automatically and likewise through manual input with the aid of the auto navigator, an automatic selection can be made with the aid of the TMC system on the basis of the instantaneous position in that traffic messages are selected, for example, which relate to locations having a predefined distance from the instantaneous position. For this, one further embodiment of the device according to the present invention provides for the auto navigator to transmit the instantaneous position to the receiver and for the receiver to select traffic messages on the basis of the transmitted position.

In this case, the instantaneous position can be transmitted from the auto navigator to the receiver after a predefined distance has been covered or a predefined time period has elapsed, or in response to a polling by the receiver.

The effect that the events communicated by the traffic messages have on the calculation of the route recommendations can vary greatly from event to event. In order not to burden the auto navigator in its computational work with the evaluation of irrelevant events, another further embodiment of the present invention provides, in addition, for an event-oriented selection criterion to be transmitted by the auto navigator to the receiver.

Due to the fact that selection criteria are produced and because they can be entered at the receiver, several variants exist with respect to selecting the traffic messages to be output. One specific embodiment of the present invention provides for selecting the traffic messages to be output in accordance with a criterion that is entered independently of the auto navigator.

The effect that this measure has on the outputting of traffic messages is that traffic messages, which do not lie on the route proposed at any one time by the auto navigator, are also output. However, traffic messages, which lie on the proposed route, are not output. If the contents of such traffic messages do not require leaving the proposed route, the auto navigator does not indicate an alternative route. Thus the vehicle driver will travel on that proposed route for which a traffic message is at hand, but has not been output.

To enable traffic messages output to the vehicle driver to be adapted to the momentary route recommendation, another specific embodiment of the present invention provides for a criterion for selecting traffic messages that are to be output to be transmitted by the auto navigator to the receiver. In this case, the number of traffic messages to be output can be limited, in particular, in that the criterion selects those traffic messages which relate to the route in question when no other route can be recommended by the auto navigator. Here, however, any possible interest the vehicle driver might have in traffic messages pertaining to other routes is ignored.

To meet the vehicle driver's need for information that goes beyond that, a third specific embodiment of the present invention provides for traffic messages to be output both in accordance with an entered criterion as well as in accordance with a criterion transmitted from the auto navigator to the receiver.

To accommodate the vehicle driver's momentary need for information, the vehicle driver can also be provided with the capability to choose whether the traffic messages will be selected in accordance with a criterion that he or she selects and/or in accordance with the criterion calculated by the auto navigator.

One advantageous embodiment of the device according to the present invention provides for the auto navigator to calculate route recommendations in consideration of the traffic messages. In such a case, traffic messages which pertain to traffic jams or slow moving traffic can be converted into traffic resistance values, which are then compared to determine various alternative routes.

The device according to the present invention preferably provides for the auto navigator to be able to decode traffic messages.

To decode the digitally coded traffic messages, location and event lists are necessary which conform with those which were used in the transmitter-end coding. Therefore, one advantageous refinement of this further embodiment provides for the auto navigator to possess a digitally stored road map, which, in addition to the data required for navigational purposes, also includes a location-code list provided for decoding the traffic messages.

BRIEF DESCRIPTION OF THE DRAWINGS

FIG. 3 shows a flow chart for the initialization process after the device according to the present invention is switched on;

The same parts in the various Figures are provided with the same reference numerals.

DETAILED DESCRIPTION

Figure 1:
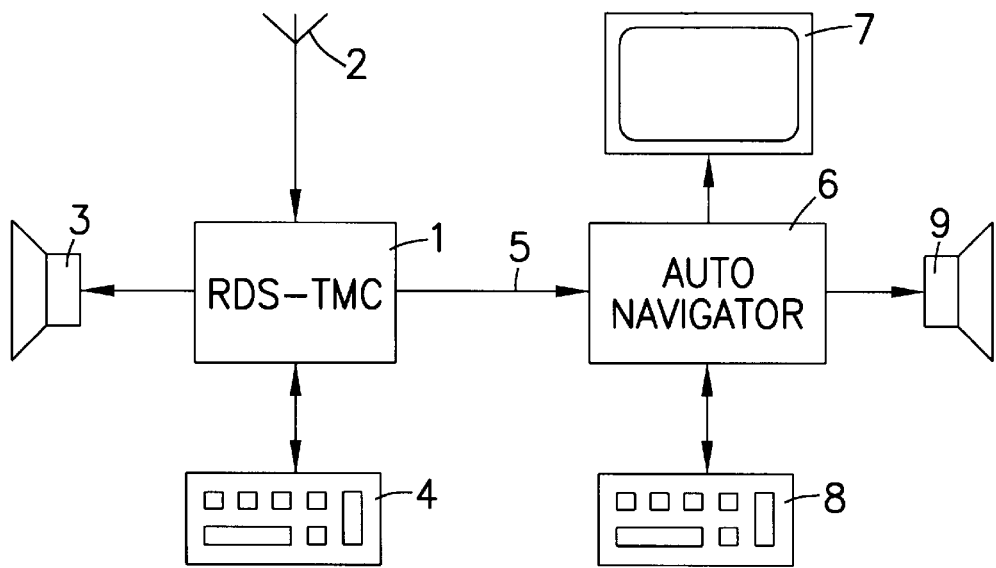
FIG. 1 shows a block diagram of a device according to the present invention.

In the case of the device according to FIG. 1, a radio receiver 1 is equipped with a device (not shown in detail) for decoding RDS signals and with a device for decoding and for managing traffic messages contained in the RDS signals. The device is referred to in the following as TMC system. To the extent that the transmissions received via an antenna 2 contain RDS signals with digital traffic messages (traffic message=TM), these signals are decoded and output via a loudspeaker 3 with the aid of voice synthesis. Besides the operation of the radio receiver, an operating control unit 4 enables the operation of the TMC system, for example, in order to select incoming messages in accordance with predefined criteria or to have already previously output messages output again.

The TMC system in radio receiver 1 is linked via a data bus 5 to an auto navigator 6. Connected to auto navigator 6 are a display device 7, an operating control unit 8 and a loudspeaker 9. The auto navigator itself contains suitable sensors for determining the instantaneous position (position finding), a mass storage unit for road maps, and a computer, which, from the instantaneous position and an entered destination, computes a route recommendation and describes this to the user with the aid of display device 7. This can be effected in known auto navigators, for example, by displaying a map with a highlighted route or in the form of instructions on how to proceed at intersections and turn-offs—i.e., through arrow symbols for straight ahead, left, right, etc. The instructions can be supported verbally by loudspeaker 9. Apart from that, auto navigators of this type have been described in diverse ways, so there is no need for a detailed clarification in connection with the present invention.

Figure 2:
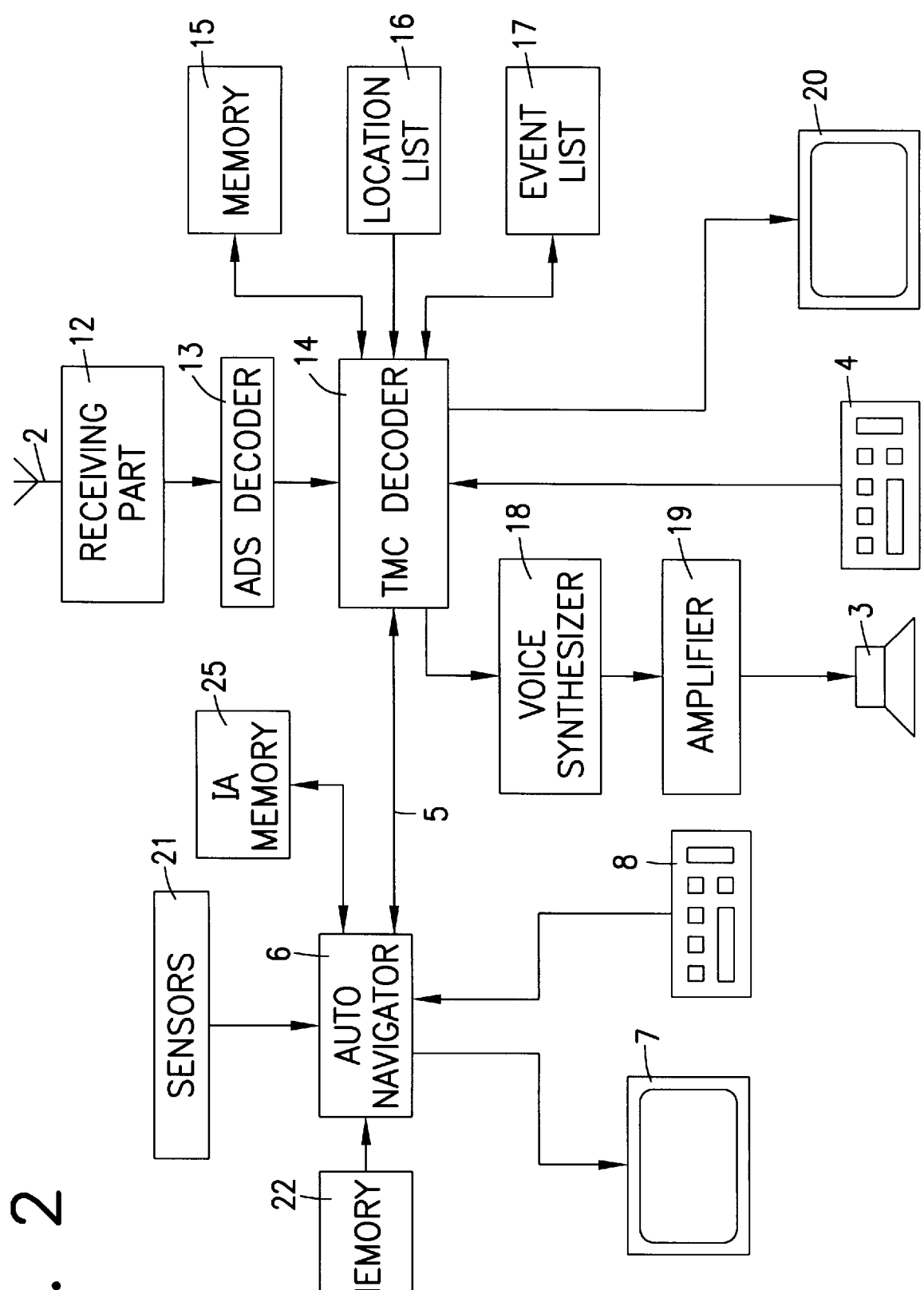
FIG. 2 shows a detailed representation of the device according to FIG. 1.

In the device shown in FIG. 2, the high-frequency signals are supplied by antenna 2 to a receiving part 12, from where the low-frequency signals are fed to an RDS decoder 13. The TMC signal is extracted from the decoded RDS signal and supplied to a TMC decoder 14. Reserved in a memory 15 for each newly received traffic message is a storage location, which receives the message element with the following information:

| Data: | Explanation: |
| --- | --- |
| LOC1 | received location code 1 |
| LOC2 | corresponding to the transmitted measurements of determined location code 2 |
| Event code | event code |
| Diversion | yes/no information, whether detour information was transmitted via TMC |
| Event dir | indication, whether event is unidirectional or bidirectional |
| Time indication | in hours and minutes |

-continued

| Data: | Explanation: |
|---|---|
| CSM/MSM | indication, whether a TMC single-sequential or multi-sequential message is at hand /2/ |
| freeformat | free format, which contains all message contents of a multi-sequential message, 2nd through 5th sequence |
| Start time | indicates from what instant on the event is valid |
| Stop time | indicates from what instant on the event is invalid |
| Database number | TMC database number expanded by the country code |

This information is decoded with the help of a location list 16 and an event list 17 to form an output. The following information is included, for example, in location list 16, loc. standing for location:

| Data: | Explanation: | Example: |
|---|---|---|
| Loc. Code | is the transmitted numerical code | 1, 2, . . . 2000, . . . |
| Loc. Type | describes the type of location | point, area, street segment |
| offset+ | reference to the loc. code of the preceding point or segment along a street | previous highway exit/entrance |
| offset− | reference to the loc. code of the following point or segment along a street | next highway exit/entrance |
| RefL | when point loc.: reference to the loc. code of the corresponding street segment | |
| RefA | when point loc.: reference to the loc. code of the corresponding area | |
| Country | country code in accordance with /1/ | defined for which country of Europe the loc. code applies |
| DB code | data base no. /1/ | defined for the corresponding country, the no. of the loc. table |

Also included in location list 16 is data for converting the decoded traffic message into a written or spoken text. This is likewise included in a list of the following type stored at 16:

| Data: | Description: | Example: |
|---|---|---|
| Road description | Type of street | A1 = highway1, A5 (M1) |
| Road name | specific name | Cologne Ring; |
| Loc sub type | Additional description for loc. type | e.g. at point: highway junction; triangle, . . . |
| Name1 | name of the location | e.g., Hildesheim Drispenstedt |
| Name2 | 2nd name of the location | only at street segment (end point) |
| Coordinates (geogr. length and width) | geographic coordinates for map display | degrees, minutes, seconds |

Traffic messages, which need to be presented to the user, can be output by means of a voice synthesizer 18, an amplifier 19, and loudspeaker 3. Moreover, the TMC system is linked to an operating control unit 4 and to a display 20. By way of operating control unit 4, the user can input selection criteria for traffic messages, so that only those traffic messages which pertain to his or her route, for example, are output to him or her. Display device 20 can be used to show operational control processes or also to present traffic messages in text form.

Auto navigator 6 having a display device 7 and an operating control unit 8 is linked via data bus 5 to the TMC system. Other components connected to auto navigator 6 are sensors 21, e.g., a GPS receiver, a memory device 22 for a road map, which besides the necessary information for auto navigator 6 also contains information for the TMC system, and a main immediate access memory 25 for buffering traffic messages and other results of the route planning.

Figure 3:
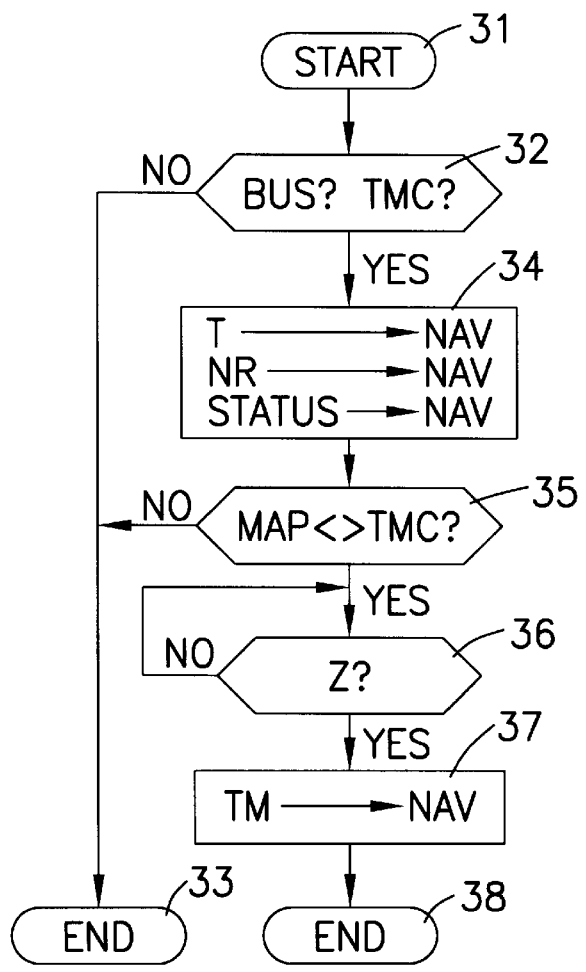

FIG. 3 illustrates the essential steps in an initialization of the TMC system and the auto navigator, to the extent that the data exchange between both systems is affected. Following a start at 31, the auto navigator queries at 32 whether data bus 5 and TMC system 14 are connected at auto navigator 6 (FIG. 2). If this is not the case, the initialization is interrupted, and the program is ended at 33. The auto navigator can then, in fact, fulfill its remaining tasks, but without the support of the TMC system.

If the data bus and the TMC system are connected, then initialization data are transmitted at 34 from the TMC system to auto navigator NAV, in particular the time of day T, the number NR or several numbers from the location lists stored in the TMC system and from a status message. The latter describes the status of the TMC system, e.g., whether traffic messages are stored or not.

It is checked in program part 35 whether the numbers NR transmitted to the auto navigator from the location lists and TMC location codes correspond to the digital road map MAP of the auto navigator. If this is not the case, then no interaction is possible between the auto navigator and the TMC system, and the initialization is ended at 33. However, if suitable location codes are present on the digital road map of the auto navigator, it is checked at 36 whether the user has input a travel destination Z. If this is the case, the transmission of the existing traffic messages to the auto navigator is started at 37. After that, the initialization is ended at 38.

Figure 4:
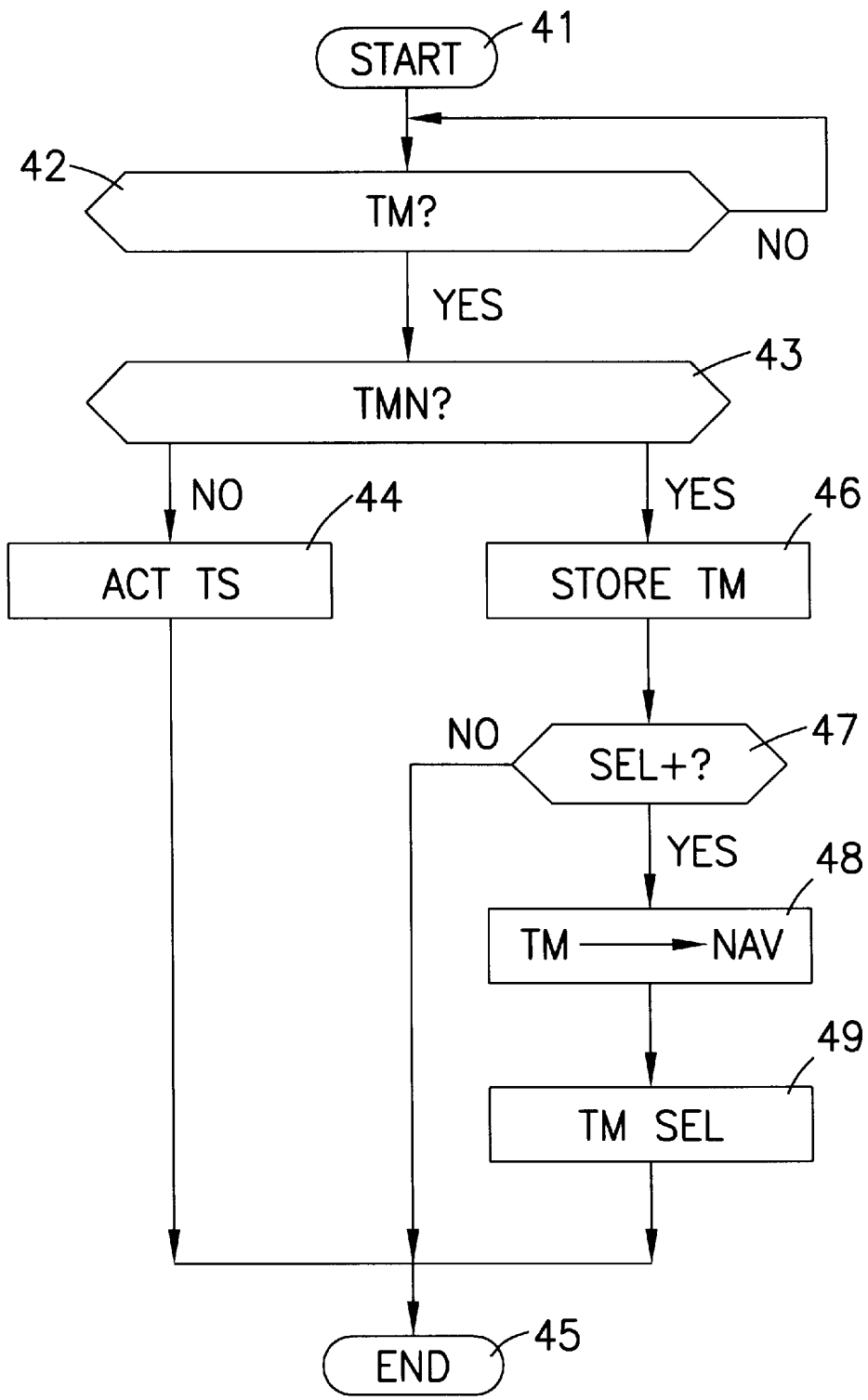
FIG. 4 shows a flow chart for elucidating the receiving and the routing of traffic messages to the auto navigator.

FIG. 4 shows the sequence for transmitting data via data bus 5 (FIG. 1) when a new traffic message is received. The program is started at 41 and runs through a loop at 42 until a traffic message is received. It is subsequently checked in the TMC system at 43 whether the traffic message is new (TMN) or whether it is a repetition of a traffic message already received earlier. If the traffic message is not new, its time stamp, which is stored together with the traffic message in memory 15 (FIG. 2), is updated (ACT TS) at 44, and the program is ended at 45.

However, if the traffic message at 43 is new, it is stored at 46 in memory 15 (FIG. 2). After that, it is checked at 47 whether the selection criterion valid at any one time is fulfilled (SEL+). If this is not the case, then the program is ended at 45 without additional measures. However, if the selection criterion is fulfilled, then the traffic message is transmitted to the auto navigator in program part 48. After that, the traffic message is flagged (49) as having been automatically output, and the program is ended at 45.

The auto navigator is able to process the traffic messages transmitted in accordance with 48 and, in particular, to consider them in the calculation of route recommendations. However, to only have to process those traffic messages which are relevant for the calculation of route recommendations on the basis of the instantaneous position and the entered destination, the auto navigator transmits new positions and new selection criteria to the TMC system. The new position can be thereby be transmitted in each case in predefined time periods or in accordance with predefined distances.

Figure 5:
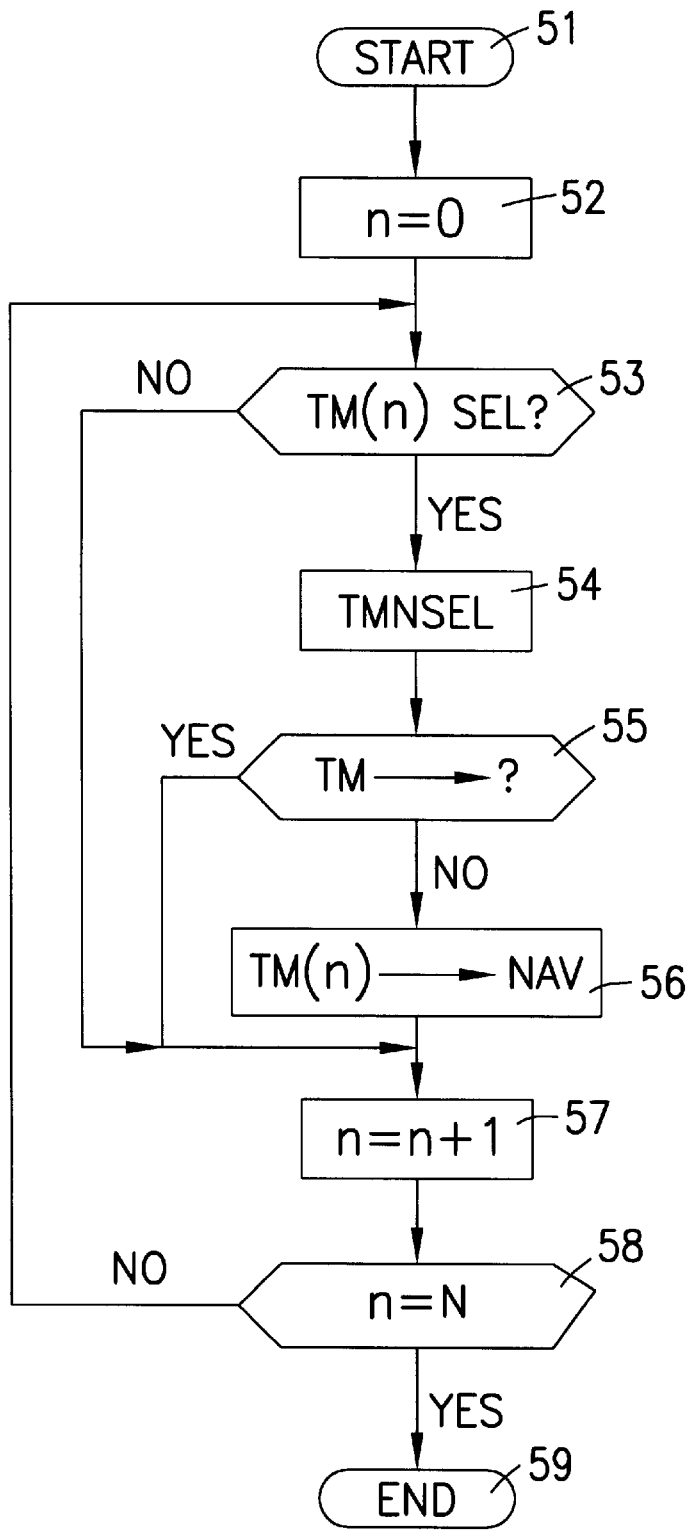
FIG. 5 shows a flow chart for elucidating the transmission of traffic messages to the auto navigator when working with a new position or when working with a new selection criterion.

Reporting the new position or the new selection criterion to the TMC system would mean per se that merely the TMC messages being received are transmitted to the auto navigator as messages that have been selected accordingly. However, traffic messages that had not been relevant before the selection criterion was changed or at the previous position, can gain significance in the calculation of the route recommendation. Therefore, a new selection is made for every new position and for every new selection criterion and, if applicable, the stored traffic messages are transmitted to the auto navigator in accordance with FIG. 5. After a start at 51, a counter n is set to 0 at 52.

A branching follows at 53 depending on whether the traffic message TM(n) satisfies the new selection criterion. If this is the case, the traffic message is flagged accordingly at 54. After that, a branching 55 follows in dependence upon whether the traffic message had already been output once or transmitted once to the auto navigator. If this is not the case, the transmission to the auto navigator follows at 56. Given a traffic message that had already been output earlier and a selection criterion that has not been satisfied at 53, counter n is subsequently incremented at 57. It is then checked at 58 whether counter n has reached the entire number N of traffic messages. For as long as this is not the case, the program is repeated, beginning with branch 53. If counter has reached the entire number N of traffic messages, the program is ended at 59.

Figure 6:
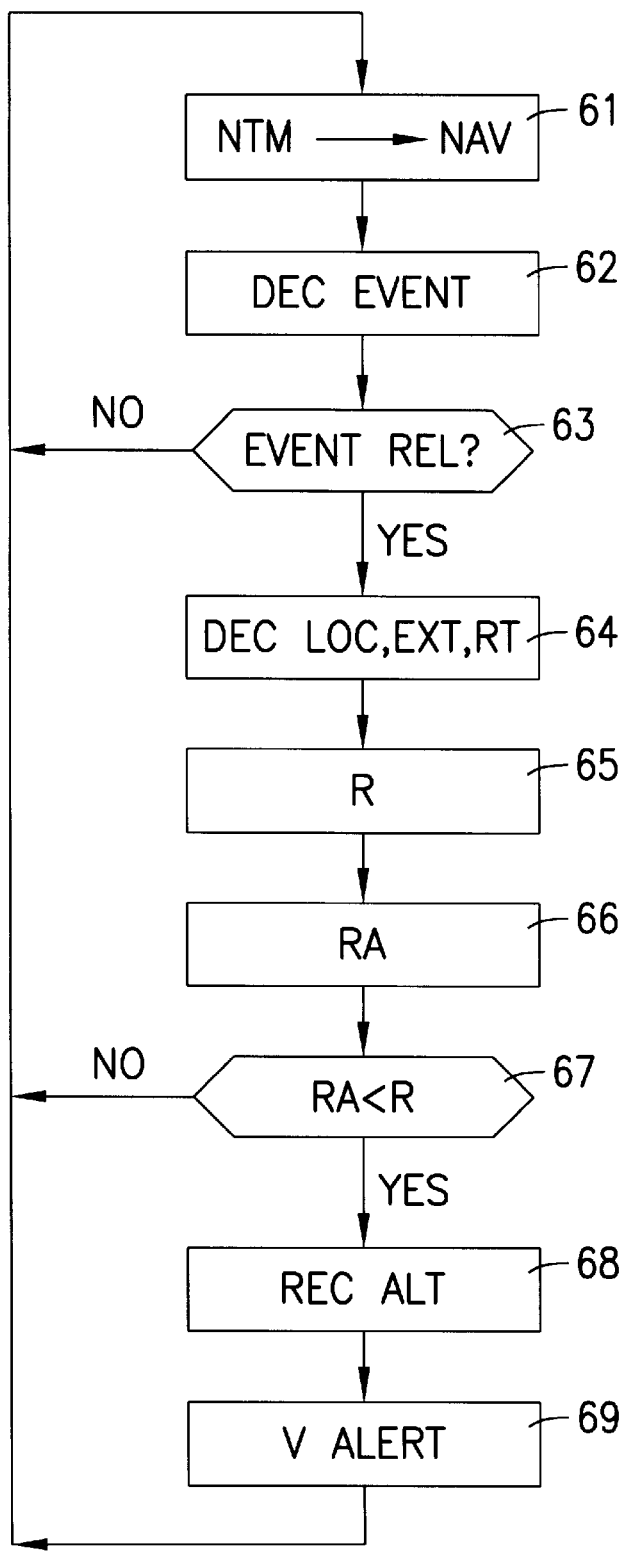
FIG. 6 shows a flow chart for the dynamic route recommendation by means of the auto navigator.

FIG. 6 illustrates an example of a dynamic route recommendation being derived by the auto navigator. At 61, the auto navigator NAV receives the traffic message TM from the TMC system, whereupon the event contained in the traffic message is decoded at 62 (DEC EVENT). It is then checked at 63 whether the event is relevant to the calculation of a route (EVENT REL?). Thus, for example, weather messages, as a rule, do not give cause to deviate from an initially recommended route, while traffic jams often do. If the event is relevant, the locations LOC, the route length EXT, and the street type RT are decoded at 64. While the coding of the traffic messages TM is essentially supported by the coding of selected locations, for example street intersections, highway exits and entrances, highway junctions and small towns, information is available to the auto navigator in the form of road maps. For that reason, various information is also converted at 64. Thus, for example, measurements transmitted along with a traffic message through indication of the locations in question are converted into a kilometer value.

Taking the traffic message into consideration, a traffic resistance value R is calculated at 65 for the initially designated route. At 66, the traffic resistance value RA of alternative routes is calculated. If the resistance value RA of the most favorable alternative route is smaller at 67 than the resistance value R of the initially designated route, the most favorable alternative route is recommended at 68. Thus, for example, a timely representation on display device 7 (FIG. 2) prompts the user to turn off from the initially designated route. Moreover, a voice alert makes the user aware of a route change at 69, and a later outputting of traffic messages relating to the initially designated route being suppressed in some instances.

However, if none of the traffic resistance values RA of the alternative route are smaller than the traffic resistance value R of the initially designated route, then no change in the route recommendation is made, but rather the program is repeated, starting at 61.

What is claimed is:

1. A device for editing and outputting information for a driver of a motor vehicle comprising:

a receiver for receiving at least one digitally coded traffic message;

an auto navigator for determining an instantaneous position of the motor vehicle and at least one route recommendation;

a data transmission device coupling the receiver and the auto navigator; and at least one output device; wherein the auto navigator determines at least one criterion for selecting at least one digitally coded traffic message to be transmitted to the auto navigator from the instantaneous position and an entered destination and transmits the at least one criterion to the receiver wherein the at least one criterion for selecting at least one digitally coded traffic message to be output is transmitted by the auto navigator to the receiver, and wherein the at least one criterion is used to select at least one digitally coded traffic message relating to a first route recommendation determined by the auto navigator when the auto navigator can determine no other route recommendation.

2. A device for editing and outputting information for a driver of a motor vehicle comprising:

a receiver for receiving at least one digitally coded traffic message;

an auto navigator for determining an instantaneous position of the motor vehicle and at least one route recommendation;

a data transmission device coupling the receiver and the auto navigator; and at least one output device;

wherein the auto navigator determines a first criterion for selecting at least one digitally coded traffic message to be transmitted to the auto navigator from the instantaneous position and an entered destination and transmits the first criterion to the receiver, and wherein the at least one traffic message to be sent to the at least one output device is selected using a second criterion that is entered independently of the auto navigator and the first criterion.

3. A device for editing and outputting information for a driver of a motor vehicle comprising:

a receiver for receiving at least one digitally coded traffic message;

an auto navigator for determining an instantaneous position of the motor vehicle and at least one route recommendation; and a data transmission device coupling the receiver and the auto navigator;

wherein depending on a selection by the driver the at least one digitally coded traffic message is selected using at least one of a first criterion that is entered by the driver independently of the auto navigator and a second criterion that is determined by the auto navigator.

* * * * *